US012798239B2

(12) United States Patent
Goto et al.

(10) Patent No.: US 12,798,239 B2
(45) Date of Patent: Nov. 17, 2026

(54) LIQUID EJECTION HEAD

(71) Applicant: RISO Technologies Corporation, Tokyo (JP)

(72) Inventors: Taiki Goto, Mishima Shizuoka (JP); Shinichiro Hida, Mishima Shizuoka (JP); Noboru Nitta, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 2 days.

(21) Appl. No.: 19/046,466

(22) Filed: Feb. 5, 2025

(65) Prior Publication Data

US 2025/0303694 A1 Oct. 2, 2025

(30) Foreign Application Priority Data

Apr. 1, 2024 (JP) ................................ 2024-058973

(51) Int. Cl.
*B41J 2/16* (2006.01)
*B41J 2/14* (2006.01)

(52) U.S. Cl.
CPC ......... *B41J 2/14274* (2013.01); *B41J 2/1623* (2013.01); *B41J 2002/14491* (2013.01)

(58) Field of Classification Search
CPC .................... B41J 2002/14491; B41J 2/14201
See application file for complete search history.

(56) References Cited

U.S. PATENT DOCUMENTS

| | | | |
|---|---|---|---|
| 2007/0211118 A1 | 9/2007 | Nishimura et al. | |
| 2015/0224764 A1 | 8/2015 | Iijima | |
| 2015/0239247 A1* | 8/2015 | Kato | H10N 30/877 347/72 |
| 2017/0106653 A1* | 4/2017 | Matsumoto | B41J 2/161 |

FOREIGN PATENT DOCUMENTS

JP 2010-201832 A 9/2010

OTHER PUBLICATIONS

Extended European Search Report mailed Jul. 31, 2025, in corresponding European Patent Application No. 25164951.3, 7 pages.

* cited by examiner

*Primary Examiner* — Julian D Huffman
(74) *Attorney, Agent, or Firm* — Kim & Stewart LLP

(57) ABSTRACT

A liquid ejection head includes nozzles arranged in a first direction, pressure chambers that are capable of storing liquid and communicate with the nozzles, a volume of each pressure chamber being varied to eject the liquid through the corresponding nozzle, a base structure, an actuator structure between the pressure chambers and the base structure and including piezoelectric elements and electrodes respectively connected to the piezoelectric elements, each element being capable of varying a volume of a corresponding one of the pressure chambers according to a drive signal input through the corresponding electrode, a drive circuit configured to output the drive signals, a connector that connects the drive circuit to the electrodes of the actuator, the connector having three or more through holes along the first direction, and bonding parts in the through holes and by which the connector and the base structure are bonded.

20 Claims, 5 Drawing Sheets

LIQUID EJECTION HEAD

CROSS-REFERENCE TO RELATED APPLICATION

This application is based upon and claims the benefit of priority from Japanese Patent Application No. 2024-058973, filed on Apr. 1, 2024, the entire contents of which are incorporated herein by reference.

FIELD

Embodiments described herein relate generally to a liquid ejection head.

BACKGROUND

In liquid ejection apparatuses such as inkjet printer heads, an actuator member including a piezoelectric body such as lead zirconate titanate (PZT) is used for ejecting liquid. In such inkjet printer heads, actuator elements are arranged at extremely fine intervals, and the wiring pattern for the actuator elements is also made fine. In order to deal with the wiring having a fine pitch of around, for example, 100 μm, a flexible printed circuit board (FPC) is directly soldered to the electrodes of the actuator elements in some cases. Further, in some cases, the FPC has protrusions and the actuator member has holes that fit with the protrusions in order to achieve alignment between the FPC and the electrodes of the actuator member.

DETAILED DESCRIPTION

Embodiments of the present disclosure provide a liquid ejection head which is low in cost and high in implementation property.

In general, according to one embodiment, a liquid ejection head comprises a plurality of nozzles arranged in a first direction; a plurality of pressure chambers that are capable of storing liquid and respectively communicate with the nozzles, a volume of each of the pressure chambers being varied to eject the liquid through the corresponding nozzle; a base structure; an actuator structure between the pressure chambers and the base structure and including a plurality of piezoelectric elements and a plurality of electrodes respectively connected to the piezoelectric elements, each of the piezoelectric elements being capable of varying a volume of a corresponding one of the pressure chambers according to a drive signal that is input through the corresponding electrode; a drive circuit configured to output the drive signals; a connector that connects the drive circuit to the electrodes of the actuator, the connector having three or more through holes along the first direction; and bonding parts in the through holes and by which the connector and the base structure are bonded.

Figure 1:
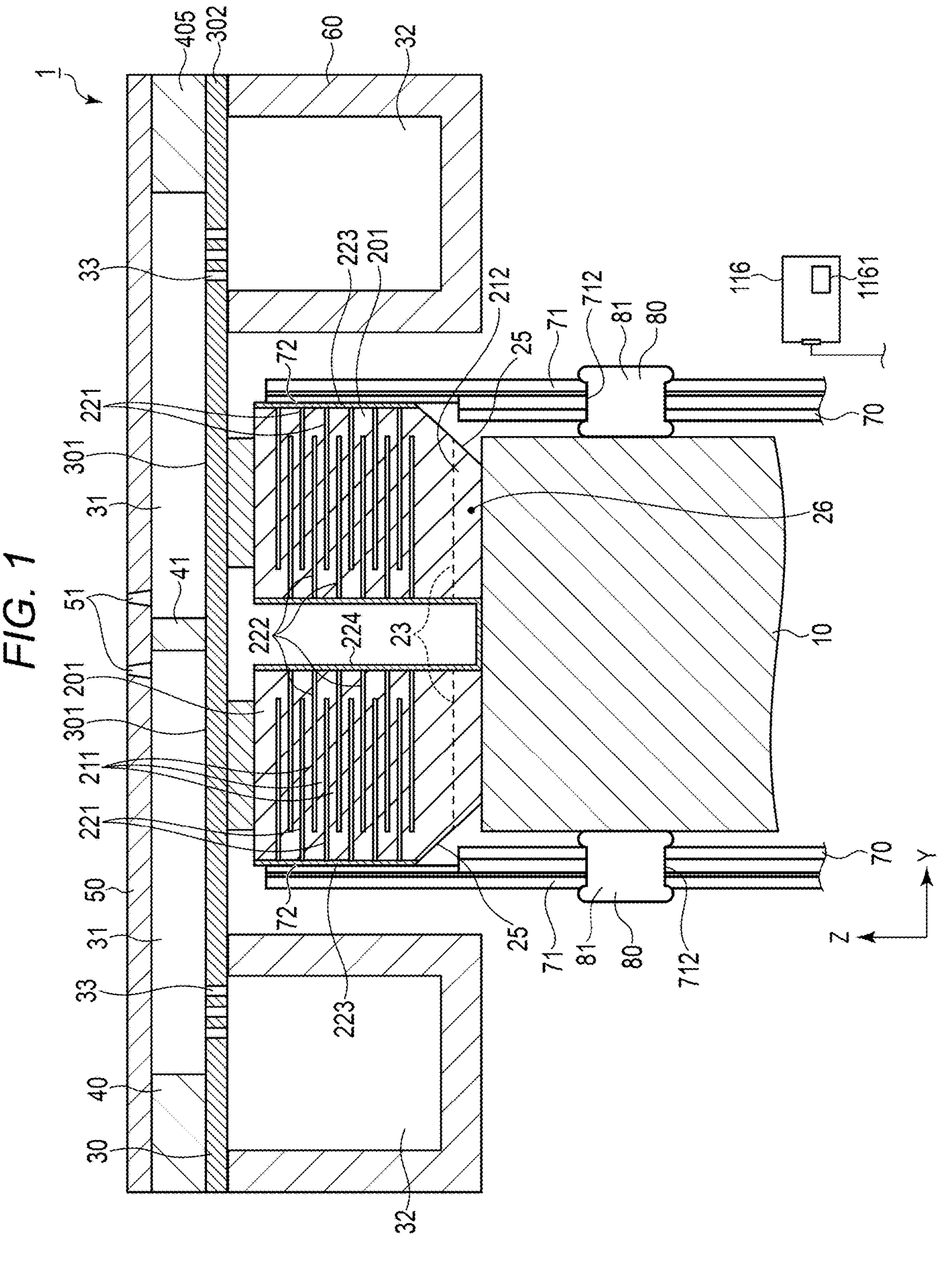
FIG. 1 is a cross-sectional view showing a configuration of a part of a liquid ejection head according to a first embodiment.
Figure 2:
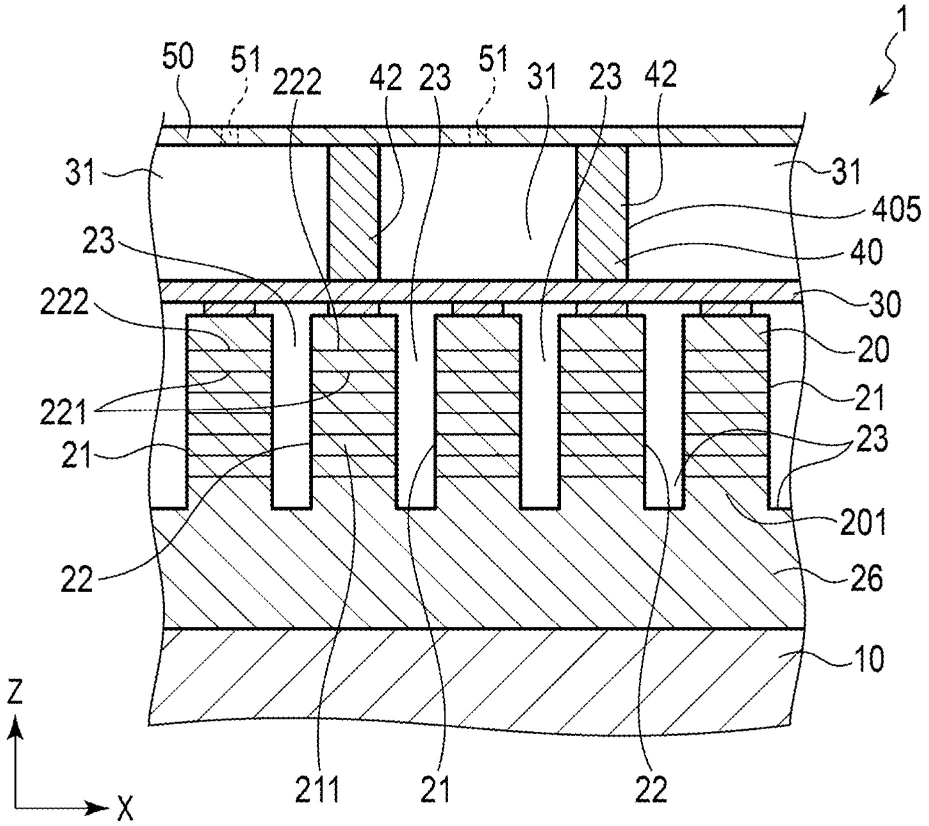
FIG. 2 is a cross-sectional view showing a configuration of a part of the liquid ejection head.
Figure 3:
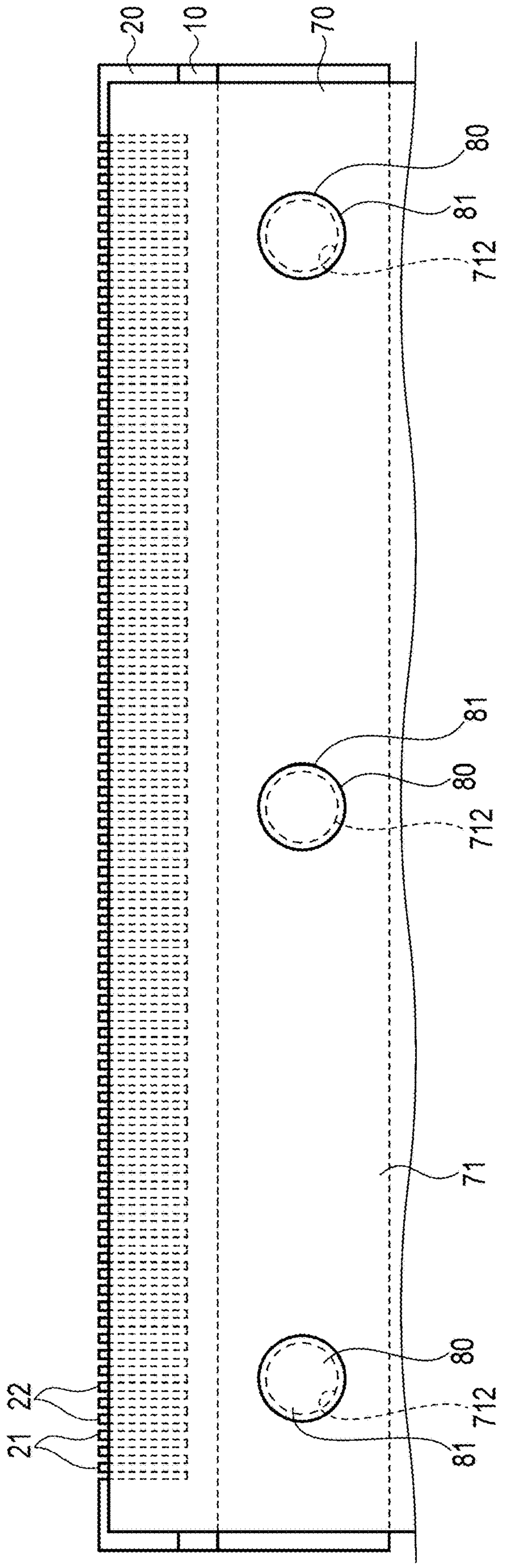
FIG. 3 is a side view showing a configuration of a part of the liquid ejection head.
Figure 4:
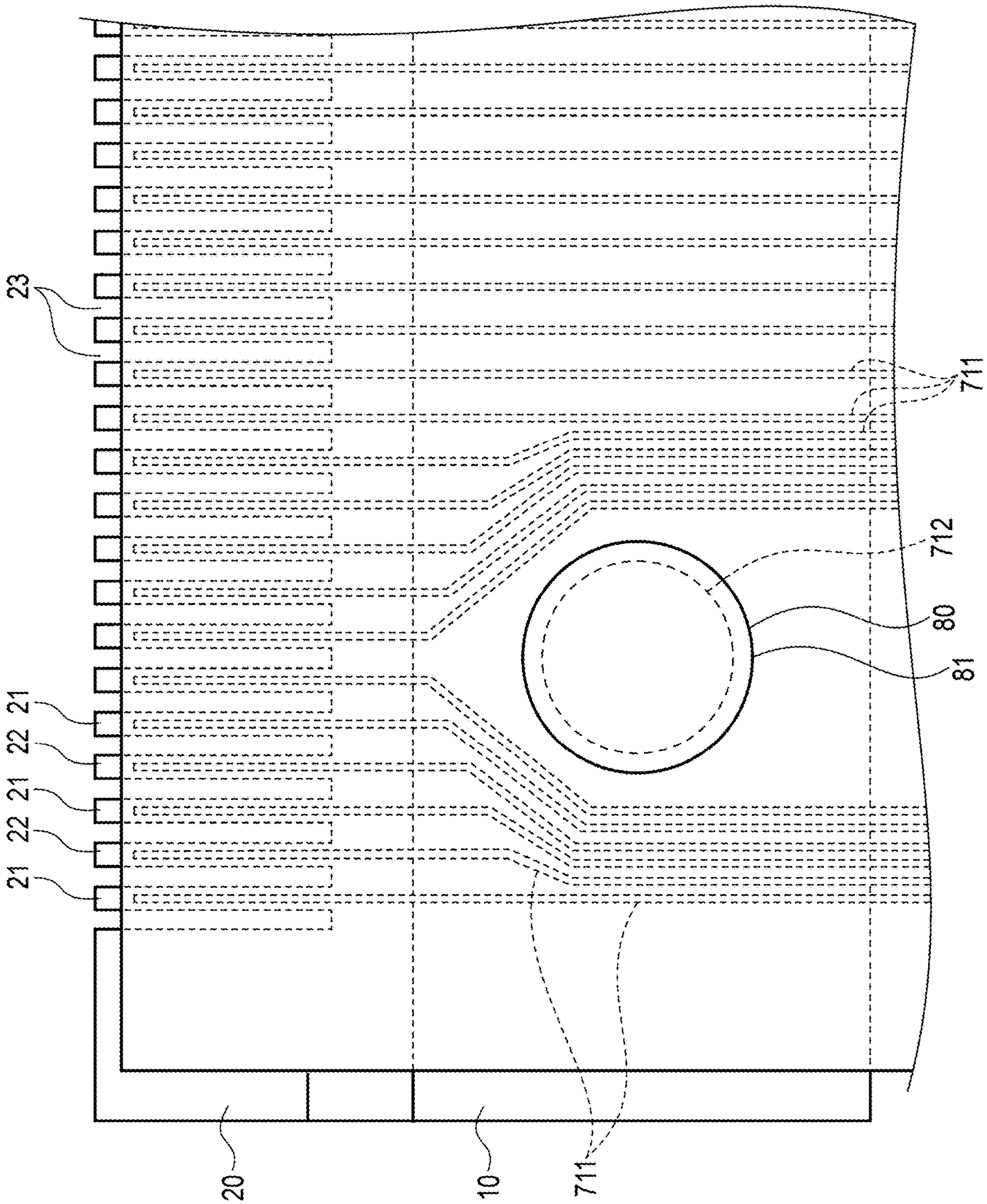
FIG. 4 is a side view showing a configuration of a part of the liquid ejection head.
Figure 5:
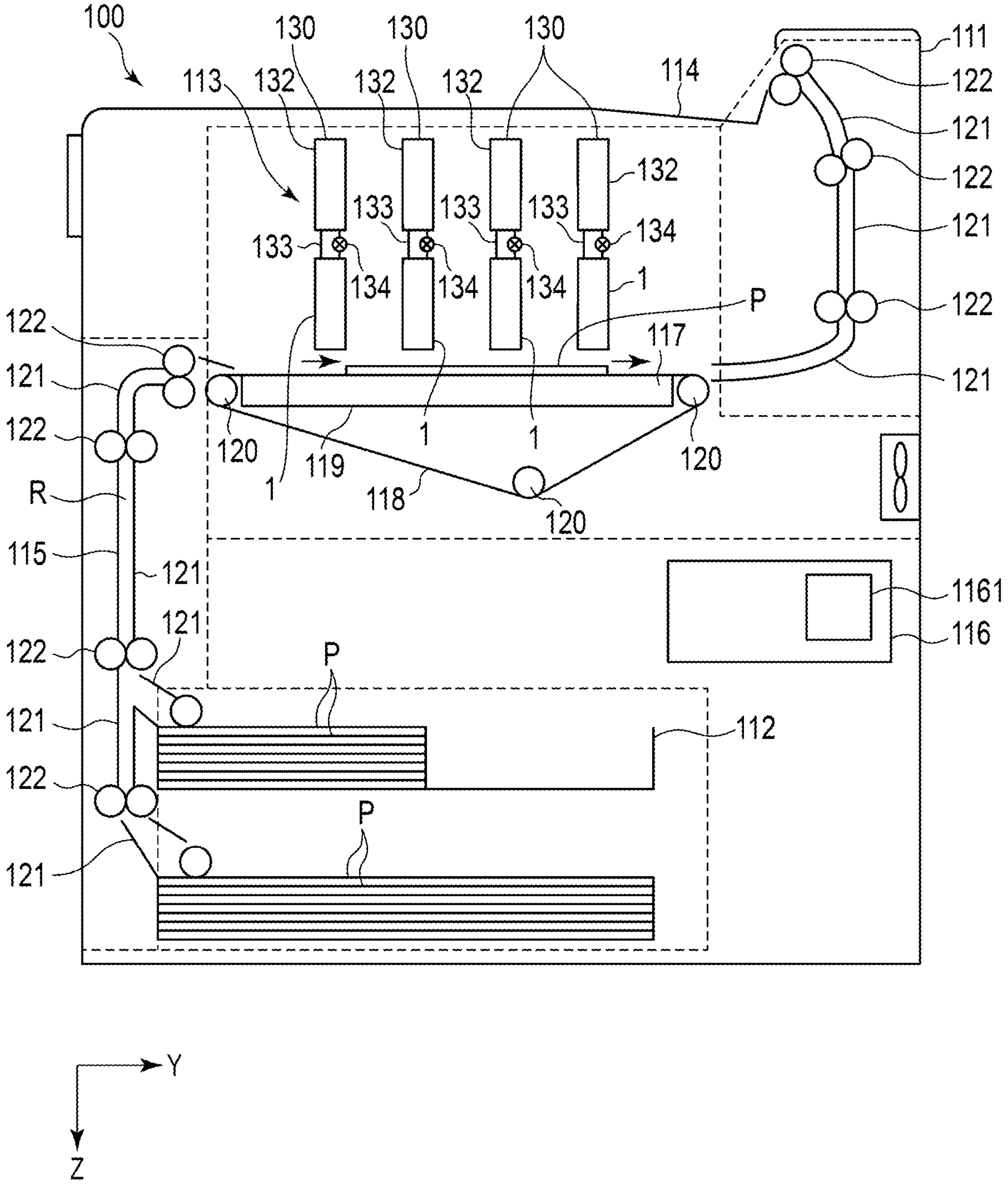
FIG. 5 is a diagram showing a schematic configuration of a liquid ejection apparatus.

A liquid ejection head 1 and a liquid ejection apparatus 100 according to a first embodiment will hereinafter be described with reference to FIG. 1 through FIG. 5. FIG. 1 and FIG. 2 are cross-sectional views showing a configuration of a part of the liquid ejection head 1, and FIG. 3 and FIG. 4 are side views showing a configuration of a part of the liquid ejection head 1. FIG. 5 is an explanatory diagram showing a schematic configuration of the liquid ejection apparatus 100. In the drawings, arrows X, Y, and Z respectively represent three directions perpendicular to each other. In the drawings, the constituents are shown with expansion, contraction, or omission as appropriate for the sake of convenience of explanation.

As shown in FIG. 1 and FIG. 2, the liquid ejection head 1 is an inkjet head provided with a base member 10, a pair of actuator members 20, a flow channel member 40, a nozzle plate 50 including a plurality of nozzles 51, a frame 60, and a drive circuit 70.

As an example, the liquid ejection head 1 is provided with two actuator members 20 as piezoelectric members, and has two nozzle arrays in which the plurality of nozzles 51 is arranged in a column direction (i.e., the X direction), two pressure chamber arrays in which a plurality of pressure chambers 31 is arranged in the column direction, and two element arrays in which a plurality of piezoelectric elements 21, 22 is arranged in the column direction. In this example, a stacking direction of a plurality of piezoelectric body layers 211, a vibration direction of the piezoelectric element 21, and a vibration direction of a vibrating plate 30 are each parallel to the Z direction.

The base member 10 is a base structure that supports the pair of actuator members 20. For example, the base member 10 has a plate-like shape. The base member 10 may be a circuit board.

The actuator member 20 is disposed at one side of the base member 10. The two actuator members 20 are arranged side by side in, for example, the Y direction.

The actuator member 20 is provided with the plurality of driving piezoelectric elements 21 to be actuators and the plurality of non-driving piezoelectric elements 22 alternately arranged along the column direction, and a coupling part 26 which integrally couples the plurality of piezoelectric elements 21, 22 at a base member 10 side. The actuator member 20 is a stacked piezoelectric member 201 in which the plurality of piezoelectric body layers 211 and a plurality of internal electrodes 221, 222 are stacked on one another.

In the actuator member 20, the plurality of driving piezoelectric elements 21 and the plurality of non-driving piezoelectric elements 22 are arranged at regular intervals in one direction.

For example, the plurality of driving piezoelectric elements 21 and the plurality of non-driving piezoelectric elements 22 are all formed to have rectangular solid columnar shapes the same in outer shape. One end side of the actuator member 20 is divided into the plurality of driving piezoelectric elements 21 and the non-driving piezoelectric elements 22 by a plurality of grooves 23 formed in the actuator member 20 from one side. The plurality of driving piezoelectric elements 21 and the non-driving piezoelectric elements 22 are arranged in the column direction at the same pitch with the grooves 23 the same in width in the arrangement direction. Further, in the actuator member 20, since the depth of the grooves 23 is set smaller than the entire length of the dimension in the Z direction of the actuator member 20, the coupling part 26 for integrally coupling the plurality of elements 21, 22 is formed at the base member 10 side of bottom surfaces of the grooves 23.

The coupling part 26 is a block-shaped member which is disposed at a base end side of the plurality of piezoelectric elements 21, 22 to couple the plurality of piezoelectric elements 21, 22. Specifically, the coupling part 26 is formed to have a plate-like shape, the longitudinal direction of which is parallel to the X direction, and which continues in the entire length in the longitudinal direction of the stacked piezoelectric member 201.

Individual electrodes forming external electrodes 223 are formed on a side surface at one side which is an end surface in the Y direction different from the Z direction of the actuator member 20. The individual electrodes are line patterns separated from each other on, for example, one side surface of the actuator member 20. In other words, on one side surface of the actuator member 20, the external terminals 223 which are line patterns separated from each other and electrode removal portions obtained by removing the electrode layer between the plurality of external electrodes 223 with PEP (Photo Engraving Process) or the like are formed alternately.

The one side surface part forms a mounting part in which ACF (Anisotropic Conducting Film) mounting or solder mounting is performed. An FPC 71 is a connector that is electrically and mechanically coupled to the individual electrodes with solder mounting or ACF mounting on one side surface of the actuator member 20. For example, one side surface on which the mounting part is formed and the other side surface at an opposite side form surfaces perpendicular to the stacking direction.

Further, a common electrode forming an external electrode 224 is formed on the side surface at the other side in the Y direction of the actuator member 20. In the common electrode, the electrode layer is formed in the entire area on the other side surface of the actuator member 20.

For example, the plurality of driving piezoelectric elements 21 and the plurality of non-driving piezoelectric elements 22 are each formed to have a rectangular shape, the transverse direction of which is parallel to the column direction of the element array, and the longitudinal direction of which is parallel to an extending direction perpendicular to the column direction and the Z direction in a plan view viewed from the Z direction.

The driving piezoelectric elements 21 are arranged at positions respectively opposed to the plurality of pressure chambers 31 provided to the flow channel member 40 in the Z direction. For example, the center position in the column direction and the extending direction of the driving piezoelectric element 21 and the center position in the column direction and the extending direction of the pressure chamber 31 are arranged side by side in the Z direction.

The non-driving piezoelectric elements 22 are arranged at positions respectively opposed to a plurality of partition wall parts 42 provided to the flow channel member 40 in the Z direction. For example, the center position in the column direction and the extending direction of the non-driving piezoelectric element 22 and the center position in the column direction and the extending direction of the partition wall part 42 are arranged side by side in the Z direction.

For example, in the actuator member 20, by performing dicing processing on the stacked piezoelectric member 201 bonded in advance to the base member 10 from an end surface at an opposite side to the base member 10 side to thereby form the grooves 23, the plurality of piezoelectric elements formed to have the rectangular columnar shapes is formed at predetermined intervals. Then, an electrode layer is provided to the plurality of columnar elements thus formed, and thus, the plurality of driving piezoelectric elements 21 and the plurality of non-driving piezoelectric elements 22 arranged alternately are formed. The plurality of driving piezoelectric elements 21 and the plurality of non-driving piezoelectric elements 22 are alternately arranged in parallel to each other across the grooves 23 in the column direction.

For example, the stacked piezoelectric member 201 forming the actuator member 20 is formed by stacking sheet-like piezoelectric materials, and then sintering the piezoelectric materials.

The piezoelectric member forming the driving piezoelectric element 21 and the non-driving piezoelectric element 22 is, for example, the stacked piezoelectric member 201. The driving piezoelectric element 21 and the non-driving piezoelectric element 22 are provided with the plurality of piezoelectric body layers 211 stacked on one another, and the internal electrodes 221, 222 formed on principal surface of each of the piezoelectric body layers 211. For example, the driving piezoelectric element 21 and the non-driving piezoelectric element 22 have the same stacked structure. Further, the driving piezoelectric element 21 and the non-driving piezoelectric element 22 are provided with the external electrodes 223, 224 each formed on the surface thereof.

The piezoelectric body layer 211 is formed of a piezoelectric ceramic material such as a PZT based material or a lead-free potassium sodium niobate (KNN) based material to have a thin plate shape. The plurality of piezoelectric body layers 211 is stacked so that the thickness direction is parallel to the stacking direction, and is bonded to each other. For example, the thickness direction and the stacking direction of the piezoelectric body layers 211 are arranged along the vibration direction (i.e., the Z direction).

The internal electrodes 221, 222 are conductive films formed of a conductive material which can be sintered such as silver-palladium to have a predetermined shape. The internal electrodes 221, 222 are formed in a predetermined area on the principal surface of each of the piezoelectric body layers 211. The internal electrodes 221, 222 are different in polarity from each other. For example, the internal electrode 221 as one of the internal electrodes 221, 222 is formed in an area which reaches one of the end portions of the piezoelectric body layer 211 and fails to reach the other of the end portions of the piezoelectric body layer 211 in an extending direction (i.e., the Y direction) as a direction perpendicular to both of the column direction (i.e., the X direction) as an arrangement direction of the plurality of driving piezoelectric elements 21 and the plurality of non-driving piezoelectric elements 22, and the vibration direction (i.e., the Z direction). The internal electrode 222 as the other of the internal electrodes 221, 222 is formed in an area which does not reach the one of the end portions of the piezoelectric body layer 211, and reaches the other of the end portions of the piezoelectric body layer 211 in the extending direction. The internal electrodes 221, 222 are respectively coupled to the external electrodes 223, 224 formed on side surfaces of the piezoelectric elements 21, 22.

Further, the stacked piezoelectric member 201 forming the driving piezoelectric element 21 and the non-driving piezoelectric element 22 is further provided with a dummy layer 212 in either or both of end portions at the base member 10 side and a nozzle plate 50 side. The dummy layer 212 is formed of the same material as the material of, for example, the piezoelectric body layer 211, and has an electrode at just one side, and is therefore not subjected to an electric field, and is therefore not deformed. For example, the dummy layer 212 does not function as the piezoelectric body, and forms a base for fixing the actuator member 20 to the base member 10, or forms a polishing margin used when performing polishing for achieving the accuracy during assembly or after the assembly.

The external electrodes 223, 224 are formed on the surfaces of the plurality of driving piezoelectric elements 21 and the plurality of non-driving piezoelectric elements 22, and are formed by end portions of the internal electrodes 221, 222. For example, the external electrode 223 is formed on one end surface in the extending direction of the piezoelectric body layer 211. The external electrode 224 is formed on the other end surface in the extending direction of the piezoelectric body layer 211.

The external electrodes 223, 224 are deposited with Ni, Cr, Au, or the like using a known method such as a plating method or a sputtering method. The external electrode 223 and the external electrode 224 are different in polarity from each other. The external electrode 223 and the external electrode 224 are disposed on respective side surface parts different from each other of the plurality of driving piezoelectric elements 21 and the plurality of non-driving piezoelectric elements 22.

For example, the external electrode 223 is an individual electrode, and the external electrode 224 is a common electrode. The external electrodes 223 forming the individual electrodes of the plurality of driving piezoelectric elements 21 and the plurality of non-driving piezoelectric elements 22 have electrode layers, which are formed on one side surface of the stacked piezoelectric member 201 in the manufacturing step and are arranged independently of each other with patterning.

The external electrode 223 is coupled to the drive circuit 70 via the FPC 71 as a flexible board which is an example of a wiring board on the side surface of the actuator member 20. For example, each of the external electrodes 223 is coupled to a control unit 116 as a drive unit via a driver IC of the drive circuit 70 with the FPC 71, and is configured so that drive control of that external electrode 223 can be performed with control by a control circuit 1161. It should be noted that the external electrode 224 may be laid around on the side surface at the external electrode 223 side to be coupled to the drive circuit 70 via the FPC 71.

By providing the external electrode 224 formed on an end surface at the other side of the actuator member 20 with a configuration in which the groove 23 is shallower than an end portion at the base member 10 side of the electrode layer, the electrode layer continues on the other side surface of the stacked piezoelectric member 201 to constitute the common electrode in a region at the base member 10 side of the bottom part of the groove 23. The external electrode 224 is, for example, grounded.

The dummy layer 212 is the same in material as the piezoelectric body layer 211. The dummy layer 212 only has an electrode at one side, and is not subjected to an electric field, and is therefore not deformed. In other words, the dummy layer 212 does not function as the piezoelectric body, but forms a base when fixed, or forms a polishing margin used when performing polishing for achieving the accuracy during assembly or after the assembly.

An end surface at the side provided with the individual electrode of the actuator member 20 is chamfered, and thus, a retraction surface 25 which is tilted so as to retract toward a direction getting away from the FPC 71 is formed at the base member 10 side. The retraction surface 25 is provided to, for example, the dummy layer 212. Specifically, in the actuator member 20, a region which does not function as the piezoelectric body and which is not deformed is configured with a partial cutout.

Further, the vibration direction of each of the piezoelectric elements 21, 22 is parallel to the stacking direction, and is displaced toward a d33 direction by applying an electric field.

For example, the number of layers of each of the piezoelectric elements 21, 22 is set no smaller than three and no larger than fifty, the thickness of each layer is set no smaller than 10 μm and no larger than 40 μm, and the product of the thickness and the total number of layers is set smaller than 1000 μm.

The driving piezoelectric element 21 vibrates when a voltage is applied to the internal electrodes 221, 222 via the external electrodes 223, 224. Here, the driving piezoelectric element 21 makes a longitudinal vibration along the stacking direction of the piezoelectric body layers 211. The longitudinal vibration mentioned here means, for example, a "vibration in the thickness direction defined by a piezoelectric constant d33." The driving piezoelectric element 21 displaces the vibrating plate 30 with the longitudinal vibration to deform the pressure chamber 31.

The flow channel member 40 is provided with the vibrating plate 30 disposed at one side of the actuator member 20 in a deformation direction so as to be opposed to the actuator member 20, and a flow channel substrate 405 stacked at one side of the vibrating plate 30.

The vibrating plate 30 is disposed between the flow channel substrate 405 and the actuator member 20 in the vibration direction. The vibrating plate 30 constitutes the flow channel member 40 together with the flow channel substrate 405. The vibrating plate 30 extends in a direction crossing the side surface of the stacked piezoelectric member 201 on which the individual electrodes and the common electrode are formed.

The vibrating plate 30 extends along a plane perpendicular to the Z direction as the vibration direction, and is bonded to a surface at one side in the vibration direction, namely the nozzle plate 50 side, of the piezoelectric body layer 211 of the plurality of piezoelectric elements 21, 22. The vibrating plate 30 is deformable, for example. The vibrating plate 30 is bonded to the driving piezoelectric elements 21 and the non-driving piezoelectric elements 22 of the actuator member 20, and the frame 60. For example, the vibrating plate 30 includes a vibration area 301 opposed to the piezoelectric elements 21, 22 and a support area 302 opposed to the frame 60.

The vibration area 301 has a flat plate shape disposed so that, for example, the thickness direction becomes the vibration direction of the piezoelectric body layers 211. A surface direction of the vibrating plate 30 extends in the arrangement direction of the plurality of driving piezoelectric elements 21 and the plurality of non-driving piezoelectric elements 22. The vibrating plate 30 is, for example, a metal plate. The vibrating plate 30 includes a plurality of vibrating regions which are opposed to the respective pressure chambers 31, and which can individually be displaced. The vibrating plate 30 is formed of the plurality of vibrating regions joined integrally with each other.

For example, the vibrating plate 30 is formed of nickel or an SUS plate, and is formed to have the thickness dimension along the vibration direction in a range from about 5 μm to 15 μm. It should be noted that in the vibration area 301, a crease or a step may be formed in a region adjacent to the vibrating region or between the vibrating regions adjacent to each other so as to facilitate the displacement of the plurality of vibrating regions. A region disposed so as to be opposed to the driving piezoelectric element 21 is displaced due to expansion and contraction of the driving piezoelectric element 21, and thus, the vibration area 301 deforms. For example, the vibrating plate 30 is required to have an extremely thin and complicated shape, and is therefore formed by an electroforming method or the like. The vibrating plate 30 is joined to an upper end surface of the actuator member 20 with bonding or the like.

The support area 302 is a plate-like member disposed between the frame 60 and the flow channel substrate 405. The support area 302 includes a communication part 33 having a through hole communicated with a common chamber 32.

For example, the communication part 33 is provided with a filter member having a number of thin holes through which the liquid can pass as the through hole.

The flow channel substrate 405 is disposed between the nozzle plate 50 and the vibrating plate 30 in the vibration direction. The flow channel substrate 405 is bonded at one side in the vibration direction of the vibrating plate 30.

The flow channel substrate 405 is provided with wall members such as a guide wall part 41 and the partition wall parts 42 to form the plurality of pressure chambers 31 separated from each other, and predetermined ink flow channels including a plurality of individual flow channels which are separated from each other and communicate the pressure chambers 31 with the common chamber 32.

In the flow channel substrate 405, the pressure chambers 31 are separated from each other with the partition wall parts 42. In other words, the both sides in the parallel arrangement direction of the pressure chambers 31 are formed of the partition wall parts 42. Each of the pressure chambers 31 is communicated with the nozzle 51 provided to the nozzle plate 50 disposed at one side. Further, the pressure chambers 31 are covered by the vibrating plate 30 at an opposite side to the nozzle plate 50.

The plurality of pressure chambers 31 is spaces formed at one side of the vibration area 301 of the vibrating plate 30, and communicate with the common chamber 32 via the individual flow channels and the communication parts 33. The plurality of pressure chambers 31 is communicated with the nozzles 51 provided to the nozzle plate 50. Further, the pressure chambers 31 are covered by the vibrating plate 30 at the opposite side to the nozzle plate 50.

The plurality of pressure chambers 31 retains the liquid supplied from the common chamber 32, and the pressure chamber 31 deforms due to the vibration of the vibrating plate 30 forming a part of the pressure chamber 31 to thereby eject the liquid from the nozzle 51.

The partition wall parts 42 are wall members which partition the plurality of pressure chambers 31 arranged in the parallel arrangement direction, and form the both side portions of the pressure chambers 31. The partition wall part 42 is disposed so as to be opposed to the non-driving piezoelectric element 22 and is supported by the non-driving piezoelectric element 22 via the vibrating plate 30. The plurality of partition wall parts 42 is disposed at the same pitch as the pitch at which the plurality of pressure chambers 31 is arranged.

The nozzle plate 50 is formed like a rectangular plate which is made of metal such as SUS Ni or a resin material such as polyimide, which has a thickness of about 10 μm through 100 μm. The nozzle plate 50 is disposed at one side of the flow channel substrate 405 so as to cover the openings at one side of the pressure chambers 31.

The plurality of nozzles 51 is arranged in a first direction the same as the arrangement direction of the pressure chambers 31 to form the nozzle array. For example, the nozzles 51 are disposed in two columns, and the nozzles 51 are respectively disposed at positions corresponding to the plurality of pressure chambers 31 arranged in two columns. Here, the nozzles 51 are each disposed at a position of the end portion in the extending direction of the pressure chamber 31.

The frame 60 is a structure to be bonded to the vibrating plate 30 together with the piezoelectric elements 21, 22. The frame 60 is disposed at an opposite side to the flow channel substrate 405 of the vibrating plate 30 of the piezoelectric elements 21, 22, and is disposed adjacent to the actuator member 20, for example. The frame 60 forms an outer frame of the liquid ejection head 1. Further, the frame 60 may form flow channels of the liquid inside. Here, the frame 60 is bonded at the other side of the vibrating plate 30, and the common chamber 32 is formed between the frame 60 and the vibrating plate 30.

The common chamber 32 is formed inside the frame 60, and is communicated with the pressure chambers 31 through the communication parts 33 provided to the vibrating plate 30 and the individual flow channels.

The drive circuit 70 is provided with the FPC 71 to be coupled to the actuator member 20 via a variety of wiring lines, the driver IC mounted on the FPC 71, and a printed wiring board mounted on the other end of the FPC 71.

The drive circuit 70 applies the drive voltages to the external electrodes 223, 224 with the driver IC to thereby drive the driving piezoelectric elements 21, and thus, increases or decreases the volumes of the pressure chambers 31 to eject droplets from the nozzles 51.

The FPC 71 is coupled to the side surface of the actuator member 20, and is coupled to the plurality of external electrodes 223, 224 of the actuator member 20. As the FPC 71, a COF (Chip on Film) on which the driver ICs as electronic components are mounted is used.

The FPC 71 has an interconnection layer 711 formed to have predetermined patterns. The FPC 71 has an interconnection coupling part 72 to be bonded to the side surface of the actuator member 20 on which the external electrode 223 is formed. On this occasion, the external electrode 223 and the interconnection layer 711 are disposed so as to be opposed to each other, and are electrically coupled to each other in the interconnection coupling part 72 with, for example, solder mounting or ACF mounting using an anisotropically conductive film. It should be noted that the interconnection layer 711 is formed to have a pattern shape avoiding through holes 712.

Further, the FPC 71 is provided with the plurality of through holes 712, and has bonding parts 80 to be bonded to the actuator member 20 or the base member 10 with a bonding material 81 supplied to the through holes 712. For example, the through holes 712 are provided to regions disposed so as to be opposed to the base member 10. The FPC 71 is provided with the bonding parts 80, which are bonded to the base member 10 with the bonding material 81 provided to the through holes 712, at a plurality of places. For example, the through holes 712 are disposed at three places, namely at right, left, and center places, and the bonding parts 80 are disposed at the three places. It should be noted that in the FPC 71, the through holes 712 are disposed in regions where the interconnection layer 711 is not formed. For example, the through hole 712 is a circular hole, and has a diameter corresponding to the width dimension in which a plurality of columns of piezoelectric elements 21, 22 is disposed. In other words, one through hole 712 is disposed in a range straddling a plurality of piezoelectric elements 21, 22 in the parallel arrangement direction.

The bonding material 81 is a light curing adhesive or an insulating adhesive. The bonding material 81 cures while having contact with a peripheral portion of the through hole 712 of the FPC 71 and an outer surface of the base member 10 to thereby fix the FPC 71 and the base member 10 to each other with bonding. For example, the bonding material 81 is disposed so as to extend toward an outer circumferential side of the inner edge of the through hole 712 on the outer surface of the FPC 71 to be bonded to the circumferential edge portion of the through hole 712 of the FPC 71 at the both sides in the thickness direction of the FPC 71, namely an obverse side and a reverse side, and is bonded to the outer surface of the base member 10 disposed to be opposed to the reverse surface side of the FPC 71. The bonding material 81 makes contact with, for example, a position around the interconnection layer 711 of the FPC 71, and is solidified.

The driver IC is coupled to the external electrodes 223, 224 via the FPC 71. The driver IC is an electronic component used for ejection control.

The driver IC generates control signals and drive signals for making the driving piezoelectric elements 21 operate. The driver IC generates the control signals for the control, for example, of selecting the timing of ejecting the ink and selecting the driving piezoelectric element 21 which ejects the ink in accordance with an image signal input from the control unit 116 of the liquid ejection apparatus 100 in which the liquid ejection head 1 is disposed. Further, the driver IC generates the voltages to be applied to the driving piezoelectric elements 21, namely the drive signals, in accordance with the control signals from the control unit 116. When the driver IC applies the drive signal to the driving piezoelectric element 21, the driving piezoelectric element 21 is driven so as to displace the vibrating plate 30 to change the volume of the pressure chamber 31. Thus, a pressure vibration occurs in the ink with which the pressure chamber 31 is filled. Due to the pressure vibration, the ink is ejected from the nozzle 51 communicated with the pressure chamber 31. It should be noted that it is possible for the liquid ejection head 1 to be able to realize gradation expression by changing an amount of an ink droplet to be landed in one pixel. Further, it is possible for the liquid ejection head 1 to be able to change the amount of the ink droplet to be landed in one pixel by changing the number of times of ejection of the ink. As described above, the driver IC applies the drive signals to the driving piezoelectric elements 21.

For example, the driver IC is provided with a data buffer, a decoder, and drivers. The data buffer saves print data for each of the driving piezoelectric elements 21 in a time-series manner. The decoder controls the driver based on the print data saved in the data buffer for each of the driving piezoelectric elements 21. The drivers output the drive signals for making the respective driving piezoelectric elements 21 operate based on the control of the decoder. The drive signals are, for example, voltage signals to be applied to the respective driving piezoelectric elements 21.

The printed wiring board is a printing wiring assembly (PWA) on which a variety of electronic components and connectors are mounted, and includes a head control circuit. The printed wiring board is coupled to the control unit 116 of the liquid ejection apparatus 100.

In the liquid ejection head 1 configured as described above, the ink flow channel including the plurality of pressure chambers 31 communicated with the nozzles 51, and the common chamber 32 respectively communicated with the plurality of pressure chambers 31 is formed by the nozzle plate 50, the frame 60, the flow channel substrate 405, and the vibrating plate 30. For example, the common chamber 32 is communicated with a cartridge, and the ink is supplied to the pressure chambers 31 through the common chamber 32. All the driving piezoelectric elements 21 are coupled with interconnections so that the voltages can be applied to the driving piezoelectric elements 21. In the liquid ejection head 1, for example, when the control unit 116 of the liquid ejection apparatus 100 applies the drive voltage to the electrodes 221, 222 with the driver IC, the driving piezoelectric element 21 as the driving target vibrates in, for example, the stacking direction, namely the thickness direction, of the piezoelectric body layers 211. In other words, the driving piezoelectric element 21 makes a longitudinal vibration.

Specifically, the control unit 116 applies the drive voltage to the internal electrodes 221, 222 of the driving piezoelectric element 21 as the driving target to selectively drive the driving piezoelectric element 21 as the driving target. Then, the deformation in a tensile direction and the deformation in a compression direction due to the driving piezoelectric element 21 as the driving target are combined with each other to deform the vibrating plate 30 to change the volume of the pressure chamber 31 to thereby introduce the liquid from the common chamber 32, and then eject the liquid from the nozzle 51.

An example of a method of manufacturing the liquid ejection head 1 will be described. First, the internal electrodes 221, 222 are formed on the piezoelectric material formed to have a sheet-like shape using print processing. Then, the plurality of piezoelectric body layers 211 having the internal electrodes 221, 222 is stacked, and a calcination treatment and a polarization treatment are performed thereon to form the stacked piezoelectric member 201.

Then, the polarization treatment of the piezoelectric element 21 of the stacked piezoelectric member 201 provided with the internal electrodes 221, 222 in advance, and then the stacked piezoelectric member 201 is attached on the base member 10 with an adhesive or the like. For example, when forming two actuator members 20, it is possible to bond the stacked piezoelectric member 201 formed integrally to the base member 10, and then divide the stacked piezoelectric member 201 into two using groove processing or the like, or it is also possible to separately prepare the two stacked piezoelectric members 201 constituting the two actuator members 20.

Then, by performing the surface treatment on the surface of the base member 10 and the surface of the stacked piezoelectric member 201 with a tool such as a diamond cutter in the state in which the stacked piezoelectric member 201 is disposed on the base member 10, the outer surface of the stacked piezoelectric member 201 is formed. Thus, it is possible to ensure the flatness of the upper surface of the actuator member 20 to which the vibrating plate 30 is bonded in the posterior step.

Then, the electrode layers which turn to the external electrodes 223, 224 due to print processing are formed on one and the other end surfaces in the stacked piezoelectric member 201. For example, an electrode may be deposited once on a vertex portion of the actuator member 20, and in this case, the electrode on the vertex portion of the actuator member 20 is removed by polishing or the like to thereby separate the external electrodes 223, 224 from each other.

Then, the electrode layer formed on one side surface is patterned to be divided into individuals. For example, by forming a shallow groove on the surface using a PEP method or laser processing in a method of patterning, the electrode layer is partially removed. In other words, the electrode layer formed on the end surface of the stacked piezoelectric member 201 is divided into a plurality of columns in the X direction, and thus, the external electrodes 223 as a plurality of line patterns corresponding to the pressure chambers 31 and the electrode removal portions obtained by partially removing the electrode layer between the plurality of external electrodes 223 adjacent to each other are formed alternately.

Subsequently, in the actuator member 20, a region at one end side as the base member 10 side on the side surface on which the external electrodes 223 are formed is removed, and then chamfering processing is performed. Subsequently, by performing processing while moving a tool such as a diamond cutter in the Z direction, the plurality of grooves 23 is provided to the actuator member 20. On this occasion, the plurality of grooves 23 is formed at the same time at a predetermined pitch to divide the stacked piezoelectric member 201 into a plurality of parts to thereby form a plurality of columnar elements to be the plurality of piezoelectric elements 21, 22 arranged at the same pitch. In this way, the plurality of driving piezoelectric elements 21 and the plurality of non-driving piezoelectric elements 22 arranged at the same pitch are formed.

Here, the groove 23 is formed to have a depth less than the entire length of the actuator member 20 so as to remain partially to thereby form the coupling part 26 in an area at the base member 10 side of the bottom surface of the groove 23.

After the patterning and processing of the grooves 23, the external electrode 224 as the common electrode where the electrode layer continues is formed on the other side surface of the coupling part 26.

Further, by forming the interconnection coupling part 72 for electrically and mechanically coupling the FPC 71 on which the electronic components such as the driver ICs as the control components are mounted to the mounting portion on the side surface of the actuator member 20 with, for example, the solder mounting or the ACF mounting using an anisotropically conductive film, applying the bonding material 81 to the plurality of through holes 712 of the FPC 71 disposed so as to be opposed to the base member 10 so as to make contact with the peripheral portions of the through holes 712 of the FPC 71 and the outer surface of the actuator member 20, and then making the bonding material cure, the bonding parts 80 for bonding the FPC 71 to the base member 10 are formed at a plurality of places. Further, the printed wiring board including the head control circuit is coupled to the FPC 71.

Then, the vibrating plate 30, the flow channel substrate 405, and the nozzle plate 50 are stacked on the actuator member 20 with bonding materials intervening therebetween in alignment with each other, then the frame 60 is disposed on the outer circumference of the actuator member 20, and then these members are bonded to each other to thereby complete the liquid ejection head 1.

An example of the liquid ejection apparatus 100 equipped with the liquid ejection head 1 will hereinafter be described with reference to FIG. 5. The liquid ejection apparatus 100 is provided with a chassis 111, a medium supply unit 112, an image forming unit 113, a medium discharge unit 114, a conveyance device 115, and the control unit 116.

The liquid ejection apparatus 100 is an inkjet printing apparatus which ejects a liquid such as ink while conveying, for example, a sheet P as a print medium which is an ejection target along a predetermined conveyance path R from the medium supply unit 112 to the medium discharge unit 114 through the image forming unit 113 to thereby perform image forming processing on the sheet P.

The chassis 111 is an outer frame of the liquid ejection apparatus 100. A discharge opening for discharging the sheet P outside is disposed at a predetermined position of the chassis 111.

The medium supply unit 112 is provided with a plurality of paper cassettes, and is able to hold a plurality of sheets P of a variety of sizes in a stacked manner.

The medium discharge unit 114 is provided with a catch tray to hold the sheet P discharged from the discharge opening.

The image forming unit 113 is provided with a support unit 117 for supporting the sheet P, and a plurality of head units 130 disposed above the support unit 117 so as to be opposed to the support unit 117.

The support unit 117 is provided with a conveyance belt 118 provided to a predetermined area for performing the image formation to have a loop shape, a support plate 119 for supporting the conveyance belt 118 from a reverse side, and a plurality of belt rollers 120 provided at the reverse side of the conveyance belt 118.

When forming the image, the support unit 117 supports the sheet P on a holding surface as an upper surface of the conveyance belt 118, and feeds the conveyance belt 118 at a predetermined timing due to a rotation of the belt rollers 120 to thereby convey the sheet P downstream.

The head units 130 are respectively provided with the plurality of (e.g., four) liquid ejection heads 1, ink tanks 132 as liquid tanks respectively mounted on the liquid ejection heads 1, coupling flow channels 133 for respectively coupling the liquid ejection heads 1 and the ink tanks 132, and supply pumps 134.

For example, there are provided the liquid ejection heads 1 of four colors, namely cyan, magenta, yellow, and black, and the ink tanks 132 for respectively containing the ink of these colors. The ink tanks 132 are coupled to the liquid ejection heads 1 with the coupling flow channels 133, respectively.

Further, to the ink tanks 132, there are connected negative pressure control devices such as pumps not shown. Further, by performing the negative pressure control on the inside of the ink tank 132 with the negative pressure control device in accordance with hydraulic head values of the liquid ejection head 1 and the ink tank 132, meniscus having a predetermined shape is provided to the ink supplied to each of the nozzles 51 of the liquid ejection head 1.

The supply pumps 134 are each a liquid feeding pump formed of, for example, a piezoelectric pump. The supply pumps 134 are disposed in the supply flow channels. The supply pumps 134 are coupled to the control circuit 1161 of the control unit 116 with the wiring lines, and are controlled by the control unit 116. The supply pumps 134 each supply the liquid ejection head 1 with the liquid.

The conveyance device 115 conveys the sheet P along the conveyance path R from the medium supply unit 112 to the medium discharge unit 114 through the image forming unit 113. The conveyance device 115 is provided with a plurality of guide plate pairs 121 and a plurality of conveying rollers 122 arranged along the conveyance path R.

The plurality of guide plate pairs 121 is each provided with a pair of plate members arranged so as to be opposed to each other across the sheet P to be conveyed, and guides the sheet P along the conveyance path R.

The conveying rollers 122 are driven under the control of the control unit 116 to rotate to thereby feed the sheet P downstream along the conveyance path R. It should be noted that sensors for detecting conveyance state of the sheet are arranged at a variety of places on the conveyance path R.

The control unit 116 is provided with the control circuit 1161 such as a central processing unit (CPU) or a dedicated circuit, a read only memory (ROM) for storing a variety of programs and so on, a random access memory (RAM) for temporarily storing a variety of variable data, image data, and so on, and an interface unit for performing input of data from the outside and output of data to the outside.

In the liquid ejection apparatus 100 configured as described above, when the control unit 116 detects a print instruction by the operation of the operation input unit by the user in, for example, the interface, the control unit 116 drives the conveyance device 115 to convey the sheet P, and outputs the print signals to the head units 130 at predetermined timing to thereby drive the liquid ejection heads 1. As the ejection operation, the liquid ejection head 1 transmits the drive signal to the driver IC using the image signal according to the image data to apply the drive voltage to the internal electrodes 221, 222 to selectively drive the driving piezoelectric element 21 as the ejection target to make the longitudinal vibration in, for example, the stacking direction to change the volume of the pressure chamber 31 to thereby eject the ink from the nozzle 51 to form the image on the sheet P held on the conveyance belt 118. Further, as the liquid ejection operation, the control unit 116 drives the supply pumps 134 to thereby supply the ink from the ink tanks 132 to the common chambers 32 of the liquid ejection heads 1, respectively.

Here, a drive operation of driving the liquid ejection head 1 will be described. The liquid ejection head 1 is provided with the driving piezoelectric elements 21 disposed so as to be opposed to the pressure chambers 31, and these driving piezoelectric elements 21 are coupled so that the voltage can be applied thereto with the wiring lines. The control unit 116 transmits the drive signal to the driver IC using the image signal according to the image data to apply the drive voltage to the internal electrodes 221, 222 of the driving piezoelectric element 21 as the driving target to selectively deform the driving piezoelectric element 21 as the driving target. Then, by combining the deformation in the tensile direction and the deformation in the compression direction of the vibrating plate 30 with each other to change the volume of the pressure chamber 31, the liquid is ejected.

For example, the control unit 116 alternately performs tension actions and compression actions. In the liquid ejection head 1, when performing the tension action of increasing the volume of the pressure chamber 31 as the target, the driving piezoelectric element 21 as the driving target is contracted while the driving piezoelectric elements 21 which are not the driving target are not deformed. Further, in the liquid ejection head 1, when performing the compression action of decreasing the volume of the pressure chamber 31 as the target, the driving piezoelectric element 21 as the target is expanded. It should be noted that the non-driving piezoelectric elements 22 are not deformed.

According to the liquid ejection head 1 and the liquid ejection apparatus 100 described above, it is possible to provide the liquid ejection head and the liquid ejection apparatus which are low in cost and high in implementation property. Specifically, the FPC 71 can be fixed on both surfaces at obverse side and reverse side with the bonding material 81 disposed in the through holes 712 provided to the FPC 71, and thus, high bonding strength can be ensured. Therefore, it is possible to prevent the bonding portion from being broken when stress is applied to the FPC 71. For example, when bonding the FPC 71 to both surfaces at one side and the other side of the actuator member 20, it is required to perform bonding at one side, and then flip the actuator member 20 to perform bonding at another side, and on this occasion, the stress is apt to be applied to the FPC 71, which leads to the breakage of the bonding portion. Further, there is a possibility that the stress is applied to the wiring board when handling the assembly, but in the embodiments described above, it is possible to easily bond the FPC 71 to the actuator member 20 or the base member 10 with the bonding material 81 provided to the through holes 712, and thus, it is possible to prevent the breakage of the bonding portion. Further, for example, when using a light curing adhesive as the adhesive, the wiring board is fixed immediately after bonding the wiring at one side to proceed to the wiring bonding operation of another surface.

Further, by disposing the bonding portions at the three places, namely at both ends and the center place, in the parallel arrangement direction, it is possible to prevent the stress from propagating to the bonding portion to the piezoelectric member.

It should be noted that the present disclosure is not limited to the embodiments described above itself, and can be implemented with modifications of the constituents within the scope or the spirit of the present disclosure.

The example in which the through holes 712 and the bonding parts 80 are disposed at the three places is described above, but this is not a limitation. For example, they may be disposed at four or more places.

Further, the example in which the FPC 71 is provided with the bonding parts 80 at the positions opposed to the base member 10 is described, but this is not a limitation, and it is possible to adopt a configuration in which the through holes 712 are disposed at positions opposed to, for example, the actuator member 20 to bond the FPC 71 to the actuator member 20.

Further, as described above, there is adopted the configuration in which the plurality of piezoelectric body layers 211 is stacked on one another, and the driving piezoelectric elements 21 are driven using the longitudinal vibration (d33) in the stacking direction, but this is not a limitation. The present disclosure may be applied to, for example, an aspect in which the driving piezoelectric elements 21 are each formed of a single layer piezoelectric member, and may also be applied to an aspect of driving the driving piezoelectric elements 21 with a transversal vibration causing a displacement in a d31 direction.

The arrangements of the nozzles 51 and the pressure chambers 31 are not limited to the embodiments described above. For example, the nozzles 51 may be arranged in two or more columns. Further, air chambers acting as dummy chambers may be formed between the plurality of pressure chambers 31. A non-circulation type liquid ejection head may be adopted besides the circulation type, or a side-shooter type liquid ejection head may be adopted besides the end-shooter type.

Further, the example in which the piezoelectric elements 21, 22 each have the dummy layers 212 at both ends in the stacking direction is described, but this is not a limitation, and the dummy layer 212 may be only disposed at one side of the piezoelectric elements 21, 22, or a configuration in which the piezoelectric elements 21, 22 are not provided with the dummy layer 212 can also be adopted. Besides the above, the configurations of and the positional relationship between the variety of components including the flow channel member 40, the nozzle plate 50, and the frame 60 are not limited to the example described above, but may be changed as appropriate.

Further, the example in which the two actuator members 20 are disposed in parallel to each other on the base member 10 is described in the embodiment described above, but this is not a limitation, and a configuration including a single actuator member 20 may be adopted.

Further, the liquid to be ejected is not limited to the ink for printing, and it is possible to adopt, for example, an apparatus for ejecting the liquid including conductive particles for forming wiring patterns of a printed wiring board.

Further, there is described the example in which the liquid ejection head 1 is used in the liquid ejection apparatus, but this is not a limitation, and can be used in, for example, a 3D printer, an industrial manufacturing machine, and medical purposes, and can achieve a reduction in size and weight, and a reduction in cost.

According to at least one embodiment described hereinabove, it is possible to provide a liquid ejection head which is low in cost and high in implementation property.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A liquid ejection head comprising:

a plurality of nozzles arranged in a first direction;

a plurality of pressure chambers that are capable of storing liquid and respectively communicate with the nozzles, a volume of each of the pressure chambers being varied to eject the liquid through the corresponding nozzle;

a base structure;

an actuator structure between the pressure chambers and the base structure and including a plurality of piezoelectric elements and a plurality of electrodes respectively connected to the piezoelectric elements, each of the piezoelectric elements being capable of varying a volume of a corresponding one of the pressure chambers according to a drive signal that is input through the corresponding electrode;

a drive circuit configured to output the drive signals;

a connector that connects the drive circuit to the electrodes of the actuator, the connector having three or more through holes along the first direction; and bonding parts in the through holes and by which the connector and the base structure are bonded.

2. The liquid ejection head according to claim 1, wherein the connector is a flexible printed circuit board.

3. The liquid ejection head according to claim 1, wherein the connector includes a plurality of wirings, each of which is connected to a corresponding one of the electrodes of the actuator with solder.

4. The liquid ejection head according to claim 3, wherein the connector includes a first portion and a second portion at which the through holes are formed, and an interval between the wirings at the first portion is greater than an interval between the wirings at the second portion.

5. The liquid ejection head according to claim 4, wherein the wirings at the first portion extend along one direction, and a part of the wirings at the second portion extends along said one direction and another direction crossing said one direction.

6. The liquid ejection head according to claim 1, wherein the bonding parts include a light curing adhesive.

7. The liquid ejection head according to claim 1, wherein the bonding parts include an insulating adhesive.

8. The liquid ejection head according to claim 1, wherein a part of the drive circuit is between the connector and the base structure.

9. The liquid ejection head according to claim 1, wherein the through holes include a first hole, a second hole, and a third hole between the first and second holes and at a center of the connector in the first direction.

10. The liquid ejection head according to claim 1, wherein in response to the drive signal, each of the piezoelectric elements vibrates in a direction along which the liquid is ejected.

11. A liquid ejection apparatus comprising:

a plurality of rollers by which a medium is conveyed; and a liquid ejection head configured to eject liquid onto the conveyed medium, the liquid ejection head including:

a plurality of nozzles arranged in a first direction, a plurality of pressure chambers that are capable of storing the liquid and respectively communicate with the nozzles, a volume of each of the pressure chambers being varied to eject the liquid through the corresponding nozzle, a base structure, an actuator structure between the pressure chambers and the base structure and including a plurality of piezoelectric elements and a plurality of electrodes respectively connected to the piezoelectric elements, each of the piezoelectric elements being capable of varying a volume of a corresponding one of the pressure chambers according to a drive signal that is input through the corresponding electrode, a drive circuit configured to output the drive signals, a connector that connects the drive circuit to the electrodes of the actuator, the connector having three or more through holes along the first direction, and bonding parts in the through holes and by which the connector and the base structure are bonded.

12. The liquid ejection apparatus according to claim 11, wherein the connector is a flexible printed circuit board.

13. The liquid ejection apparatus according to claim 11, wherein the connector includes a plurality of wirings, each of which is connected to a corresponding one of the electrodes of the actuator with solder.

14. The liquid ejection apparatus according to claim 13, wherein the connector includes a first portion and a second portion at which the through holes are formed, and an interval between the wirings at the first portion is greater than an interval between the wirings at the second portion.

15. The liquid ejection apparatus according to claim 14, wherein the wirings at the first portion extend along one direction, and a part of the wirings at the second portion extends along said one direction and another direction crossing said one direction.

16. The liquid ejection apparatus according to claim 11, wherein the bonding parts include a light curing adhesive.

17. The liquid ejection apparatus according to claim 11, wherein the bonding parts include an insulating adhesive.

18. The liquid ejection apparatus according to claim 11, wherein a part of the drive circuit is between the connector and the base structure.

19. The liquid ejection apparatus according to claim 11, wherein the through holes include a first hole, a second hole, and a third hole between the first and second holes and at a center of the connector in the first direction.

20. The liquid ejection apparatus according to claim 11, wherein in response to the drive signal, each of the piezoelectric elements vibrates in a direction along which the liquid is ejected.

* * * * *